United States Patent [19]

Chase

[11] 4,291,354

[45] Sep. 22, 1981

[54] EXTENDED LIFE MULTICHANNEL MAGNETIC TRANSDUCER

[75] Inventor: James P. Chase, Sunnyvale, Calif.

[73] Assignee: Ampex Corporation, Redwood City, Calif.

[21] Appl. No.: 45,558

[22] Filed: Jun. 4, 1979

[51] Int. Cl.³ .......................... G11B 5/11; G11B 5/22; G11B 5/27; G11B 5/42

[52] U.S. Cl. .................................. 360/129; 360/121; 360/122; 29/603

[58] Field of Search .............................. 360/122, 129

[56] References Cited

U.S. PATENT DOCUMENTS

| | | | |
|---|---|---|---|
| 3,417,386 | 12/1968 | Schneider | 360/122 |
| 3,499,214 | 3/1970 | Schneider | 360/122 |
| 3,686,466 | 8/1972 | Sato et al. | 360/122 |
| 3,758,727 | 9/1973 | Kruklitis | 360/122 |
| 3,900,895 | 8/1975 | Girdner et al. | 360/129 |
| 3,928,908 | 12/1975 | Case | 360/122 |

Primary Examiner—Robert S. Tupper
Attorney, Agent, or Firm—Robert G. Clay; Elizabeth E. Strand

[57] ABSTRACT

The transducer has a pole tip plate containing magnetic pole tips defining transducing gaps and a core housing providing electric shielding and containing magnetic cores engaging the poles. The tip plate has a first part of a wear-resistant, nonmagnetic, machinable material in the transducer-to-medium interface area, providing long wear, and an integrally joined contiguous second part of a conductive, nonmagnetic, machinable material, providing electric shielding.

In accordance with the method, corresponding surfaces of a first block portion made of nonmagnetic, wear-resistant, machinable material and of a second block portion made of a nonmagnetic, conductive, machinable material are integrally joined together. Pole tips are secured into parallel grooves machined transversely to the joined surfaces to form a half-tip plate. Two matched half-tip plates are assembled and joined to a core holder containing transducer cores and windings, with the first block portions abutting and with corresponding pole tips in registration, defining transducing gaps between them and with the pole tips engaging the cores. The transducer is contoured to expose the pole tips and transducing gaps therebetween.

15 Claims, 12 Drawing Figures

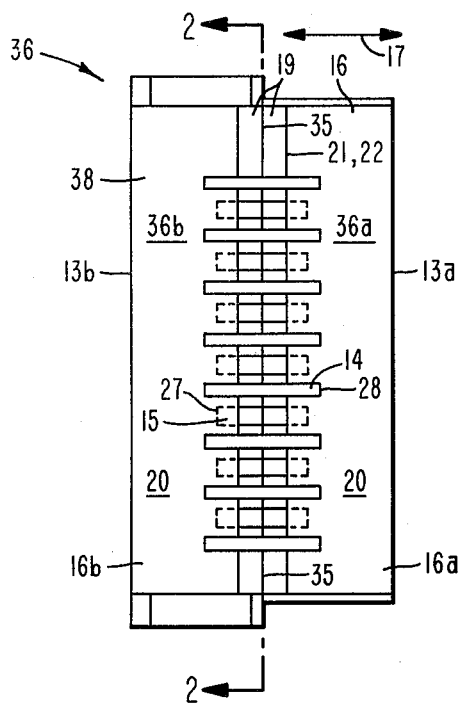
FIG_1
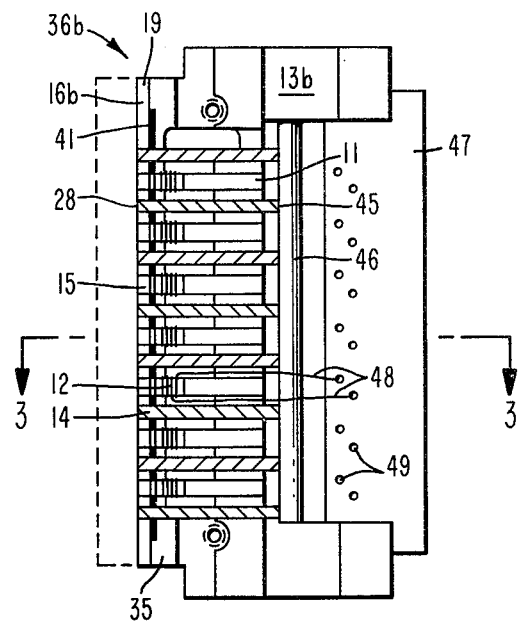
FIG_2
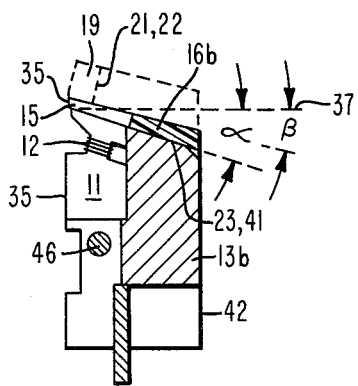
FIG_3
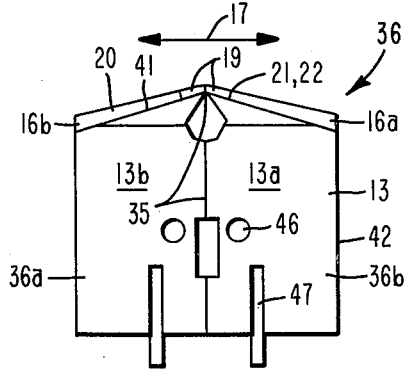
FIG_4
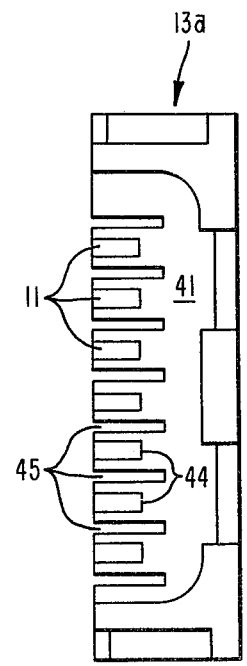
FIG_5

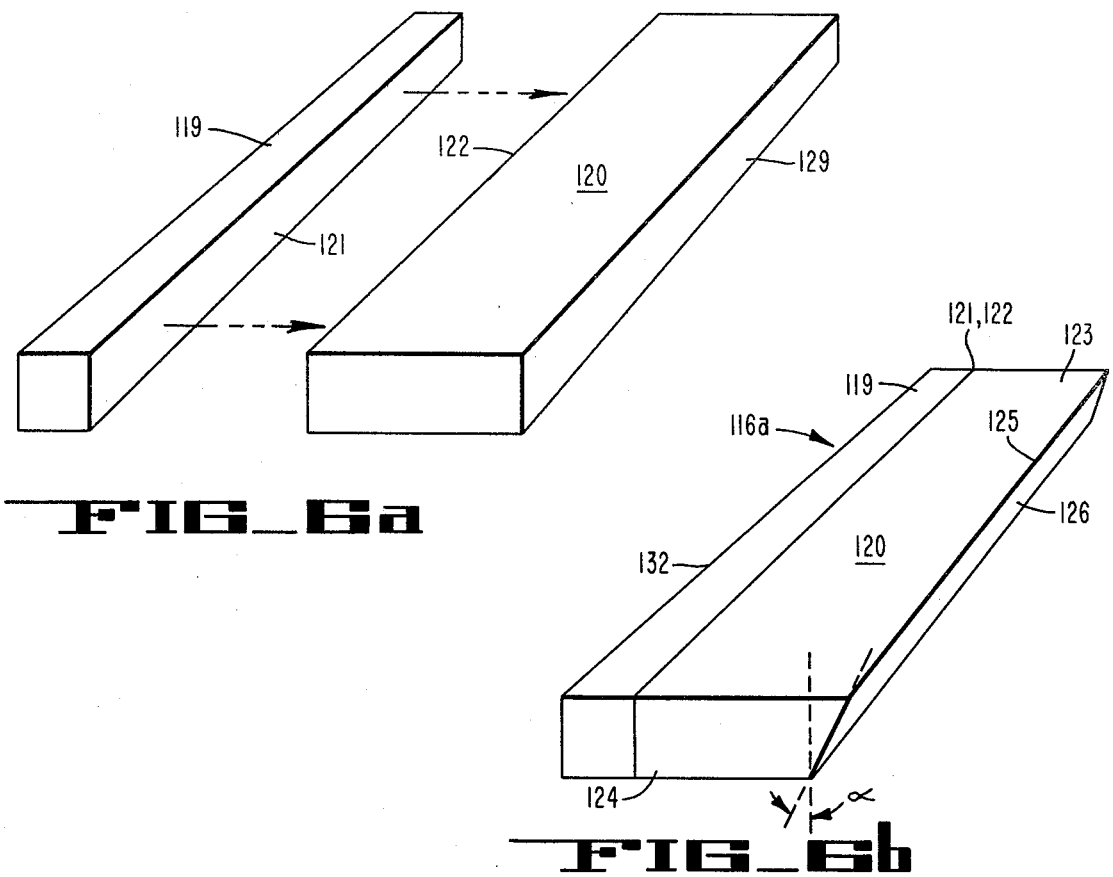
FIG_6a
FIG_6b
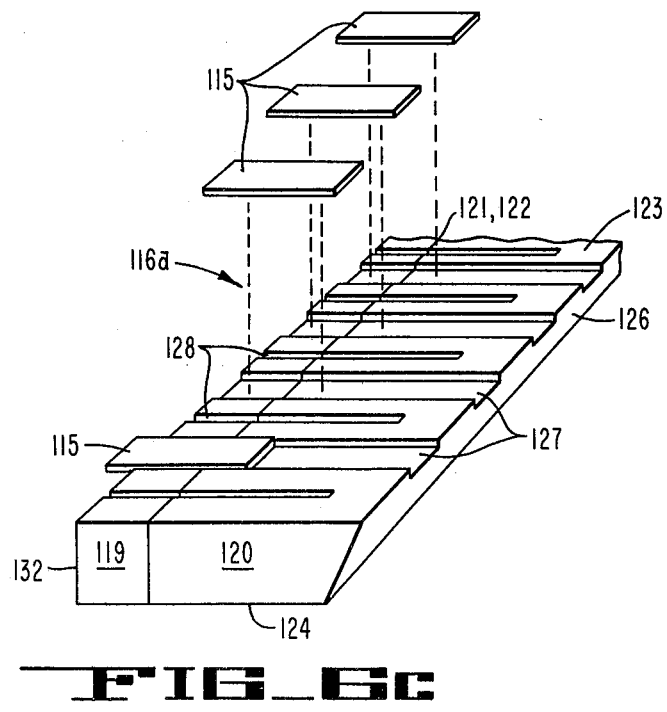
FIG_6c

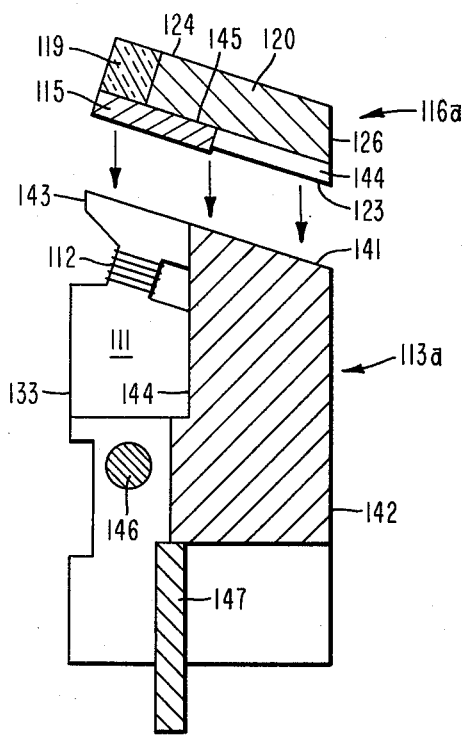
FIG_6d
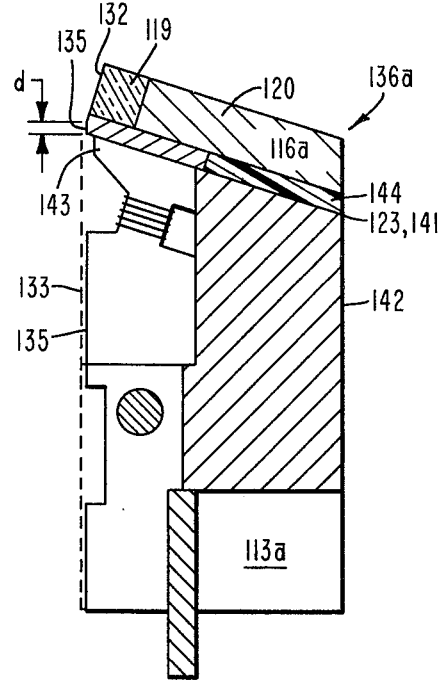
FIG_6e
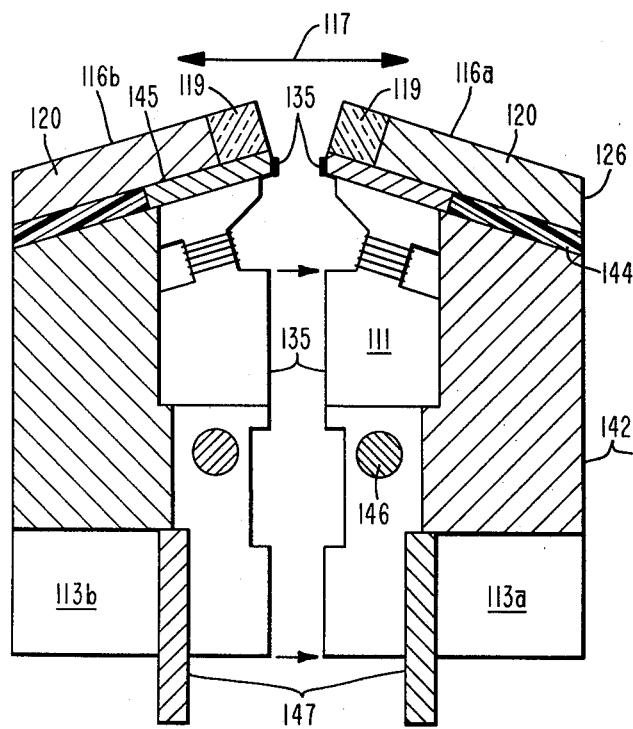
FIG_6f
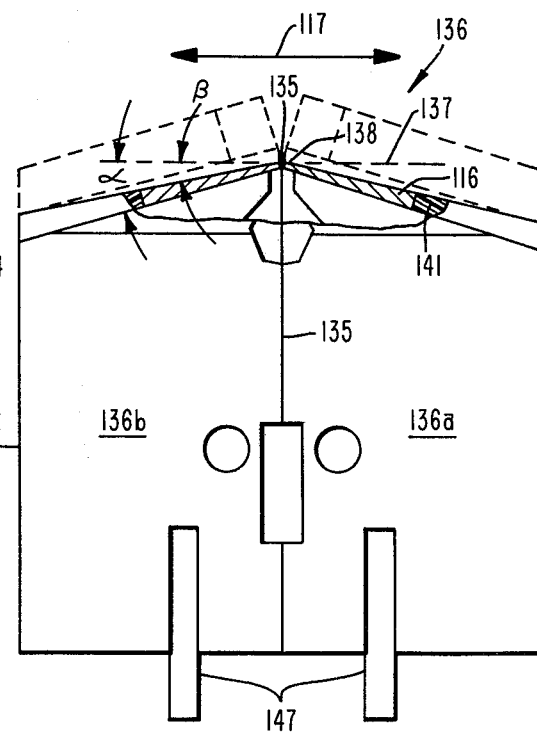
FIG_6g

EXTENDED LIFE MULTICHANNEL MAGNETIC TRANSDUCER

BACKGROUND OF THE INVENTION

The invention relates to multichannel magnetic transducers having improved wear characteristics and to the method of manufacturing such transducers. The invention is particularly useful for applications where the transducer is in direct contact with the recording medium, such as longitudinal tape drives utilized in analog or digital, instrumentation or audio tape recorders.

Transducers in direct contact with the recording medium generally exhibit extensive wear in the transducer-to-medium interface area due to abrasion effected by the medium. As is well known, such wear is undesirable, since it results in limited head life. Consequently, replacement heads have to be provided frequently at considerable cost.

An effort has been made heretofore to extend transducer life, such as by utilization of various wear-resistant materials in the transducer structure. For example, there are known prior art transducers having magnetic pole tips mounted in a tip plate made of extremely hard, wear-resistant nonmagnetic alloys. However, machining of such extremely hard materials is very difficult; and, thus, their use for tip plates is impractical. Other known prior art transducers utilize tip plates having hard, nonmagnetic, wear-resistant alloys deposited by a known method on a pre-machined relatively soft nonmagnetic metal to avoid the problem of machining hard alloys. The latter method is expensive, since it includes complicated, time consuming method steps, as well as steps requiring great precision of fabrication.

U.S. Pat. Nos. 3,843,964 and 3,909,932, both commonly assigned to Ampex Corporation, represent another group of prior art multichannel transducers and manufacturing methods where magnetic pole tips are supported by a wear-resistant, nonmagnetic ceramic holder. This type of transducer does not provide necessary electromagnetic shielding protection from surrounding radiation fields. Therefore, these multichannel transducer structures are not suitable for applications where external noise picked up by the transducer would seriously distort the output signal therefrom. For example, in wideband instrumentation recording such noise might cause intolerable degradation of the high frequency signals.

SUMMARY OF THE INVENTION

It is an object of the invention to provide a multichannel transducer assembly structure which has an extended life and, at the same time, provides effective shielding against external radiation noise.

It is a further object of the invention to provide a multichannel transducer assembly structure, having desired electric shielding protection, and, at the same time, having a wear-resistance transducer-to-medium interface, made of a nonmagnetic, machinable material.

It is another object of the invention to provide a method of manufacturing a multichannel transducer assembly having the above-indicated features and adapted for economical production.

The multichannel magnetic transducer assembly of the invention has a pole tip plate of a nonmagnetic material, supporting a plurality of spaced magnetic pole tips defining transducing gaps. The tip plate is formed of two corresponding halves abutting at a gap plane. Each half has a first part of nonmagnetic, wear-resistant, machinable material, extending in the transducer-to-medium interface area and a contiguous second part of nonmagnetic, conductive, machinable material. A bond integrally joins the two parts at confronting planar surfaces. The pole tips are mounted in spaced, parallel slots machined transversely to the bonded surfaces of the tip plate. Magnetic cores and coils are mounted in a core holder and are spaced correspondingly with the pole tips. The core holder is made of a nonmagnetic material and it has electric shielding properties. Two corresponding half-tip plates are assembled and integrally joined to the core holder, with the first parts of the half-tip plates abutting and having the pole tips in registration with transducing gap material between them. The pole tips engage the core members, thus forming a plurality of transducer circuits of the integral multichannel transducer assembly.

In accordance with the method of the invention, a multichannel magnetic transducer assembly is made by forming a first block portion of a nonmagnetic, wear-resistant, machinable material, having two opposite planar surfaces. A second block portion is formed of a nonmagnetic, conductive, machinable material, having a planar surface corresponding to one planar surface of the first block portion. A composite block is formed by integrally joining the corresponding planar surfaces of the respective block portions. A plurality of spaced, parallel grooves is machined in the composite block transversely to the jointed surfaces and magnetic pole tips are integrally joined into the grooves to obtain a half pole tip plate. Two corresponding half-tip plates are aligned and integrally joined to a core holder made of a nonmagnetic material and having electric shielding properties. The core holder supports a plurality of magnetic cores and coils, spaced correspondingly with the pole tips. The half-tip plates are aligned with their respective first portions abutting at respective planar surfaces opposite the integrally joined surfaces and with their respective pole tips in registration, having a transducing gap material disposed between the pole tips. The pole tips engage the magnetic cores, thus completing a plurality of individual magnetic circuits of the multichannel transducer assembly. The integrally joined transducer assembly is contoured at the pole tip plate to expose the pole tips and transducing gaps to form a transducer-to-medium interface.

The foregoing and other objects, features and advantages of the invention will become apparent from the following description and accompanying drawings describing and illustrating the preferred embodiments of the invention.

BRIEF DESCRIPTION OF THE DRAWINGS

FIG. 1 is a front elevation view of the magnetic transducer assembly;

FIG. 2 is a section view of the magnetic transducer assembly of FIG. 1 taken along line 2—2 thereof;

FIG. 3 is a section view of the transducer assembly of FIG. 2 taken along line 3—3 thereof;

FIG. 4 is an end view of the transducer assembly of FIG. 1;

FIG. 5 is a front elevation view of one-half of the transducer assembly of FIG. 1 with the tip plate and shields removed; and FIGS. 6a through 6g are illustrations of various method steps utilized for constructing the magnetic multichannel transducer assembly in accordance with the invention.

DETAILED DESCRIPTION OF THE PREFERRED EMBODIMENTS

FIGS. 1 to 5 show a preferred embodiment of the multichannel transducer assembly of the invention. The transducer assembly 36 comprises two corresponding half assemblies 36a, 36b, abutting at a gap plane 35, as shown in FIGS. 1 and 4. Since both half transducer assemblies are similar, only half assembly 36b is shown in FIG. 2 as a section view, taken along line 2—2 of the multichannel transducer assembly 36 of FIG. 1.

With reference to FIGs. 2, 3 and 4, the half transducer assembly 36b comprises a half core holder 13b and a half-tip plate 16b, rigidly mounted together as it will be described below. First, the structure of the core holder will be described, followed by the description of the tip plate designed in accordance with the invention.

The half core holder 13b is made preferably of a readily machinable, nonmagnetic, electrically conductive material, such as aluminum or brass, having excellent electric shielding properties. Two similar core holder halves 13a and 13b are joined to abut at a transducing gap plane 35, as best shown in FIG. 4, to form a core holder 13. The half core holder 13a is shown in FIG. 5, having a plurality of parallel core slots 44 and shield slots 45 formed therein. Magnetic cores 11, best shown in FIG. 3, with transducing windings 12 thereon, are secured in the core slots 44. Shield slots 45 serve to accommodate electromagnetic shields 14 shown in FIGS. 1 and 2, however, not shown in FIG. 5. These shields are arranged between adjacent cores and spaced apart therefrom to prevent interchannel cross-talk, as it is known in the art.

The core 11 are rigidly held in place within the half core holder 13a, such as by a potting compound of epoxy resin, as is well known in the art. In the preferred embodiment of the invention, the cores 11 are made of magnetic ferrite with respect to the high permeability and low loss characteristics obtained at high frequencies. The shields 14 are preferably of mumetal sandwiched between two berylium-copper laminations. It is understood, however, that other suitable materials may be utilized for holder 13, cores 11, as well as shields 14, respectively.

A shield stop rod 46 of nonmagnetic material, such as stainless steel, is arranged in the holder to support the shields 14 in a desired position and to prevent them from falling through the shield slots 45 prior to epoxy bonding, as it is best shown in FIG. 2. A connector plate 47 of an electrically insulating, nonmagnetic material, for example, epoxy board, is arranged in the core holder 13a and secured therein, for example, by epoxy bonding. The connector plate 47 is provided with holes 49, to which terminals 48 of transducer coil windings 12 are connected. For better clarity of representation, only one such pair of terminals 48 is shown in FIG. 2.

To place the ferrite cores 11 as close as possible to the recording medium, the top surfaces 41 of the holders 13a, 13b with the cores 11 inserted therein are respectively beveled at an angle α with respect to a horizontal reference surface 37 shown in FIG. 3, which surface is perpendicular to the transducing gap plane 35. In the preferred embodiment α=17 degrees. Thus, the beveled top surface 41 of the assembled core holder 13 is symmetrical with respect to the gap plane 35 and extends at a predetermined angle thereto, as described above.

The tip plate 16 serves to securely support a number of spaced magnetic pole tips 15, corresponding to the number of cores 11 contained in the core holder 13. Two corresponding halves 16a, 16b of the tip plate are assembled with their respective first parts 19 abutting and with corresponding pairs of magnetic pole tips 15 in registration with a layer of nonmagnetic gap material disposed between each pole tip pair, thus defining a plurality of transducing gaps aligned at the gap plane 35. A suitable gap forming material is, for example, silicon monoxide or glass, disposed in a known manner over confronting pole tip surfaces at 35, as it will become apparent from the description of the preferred method of the invention. The pole tips 15 are spaced apart in the tip plate 16 to correspond to the spacing of the magnetic cores 11, arranged in holder 13, as it is best shown in FIGS. 2 and 3. The tip plate 16 is firmly attached to the holder 13 at beveled upper surface 41 thereof, for example, by epoxy bonding. Each magnetic core 11 with winding 12 thereon engages a corresponding pole tip 15, thus forming a complete magnetic circuit transversing a nonmagnetic gap at 35. Each such magnetic circuit represents a separate transducing channel of the multichannel transducer assembly 36.

The electromagnetic shields 14 arranged in the transducer assembly 36 extend into both shield slots 28 provided in tip plate 16 and shield slots 45 of core holder 13, as shown in FIG. 2, to provide effective cross-talk protection between adjacent transducers.

FIG. 5 shows a half core holder 13a, that is, a half transducer assembly 36a with the half-tip plate 16a removed, with cores 11 mounted in core slots 44 and with shields 14 removed.

As shown in FIGS. 1 and 4, the pole tip plate 16 is formed of two identical and precisely matched half portions 16a and 16b, assembled and joined to matched half core holders 13a, 13b, respectively. Each half tip plate 16a, 16b has a first part 19, provided in the transducer-to-magnetic medium interface area. The first part 19 is made of a readily machinable, nonmagnetic material having an extremely low wear rate when subject to the abrasive effects of a magnetic medium. For example, a suitable material is machinable glass ceramic, such as "Macor" sold by Corning Glass Works. Each half tip plate 16a, 16b has a second contiguous part 20, made of a readily machinable, nonmagnetic material having good electrical conductivity, such as a relatively soft nonmagnetic metal, for example, aluminum or brass. In the preferred embodiment of the invention both the core holder 13 and the second part 20 of the tip plate 16 are made of the same machinable, nonmagnetic material, having excellent shielding properties against external electric fields, such as 7075 aluminum. The first part 19 and second part 20 of tip plate 16 are integrally joined together with a suitable adhesive, for example, by epoxy bond, at corresponding confronting planar surfaces 21 and 22, as shown in FIGS. 1 and 3 and will become more apparent from the description of the preferred method of the invention. Preferably, the length of the first part 19 of the tip plate 16 in the direction of the relative transducer-to-medium movement, as shown by arrows at 17 in FIGS. 1 and 4, is equal to the length of the transducer-to-medium contact. This latter feature is desirable since, if the first part 19 is made of a nonconductive material, for example, of machinable glass ceramic, an extension of the non-conductive surface area bonding that which is necessary for providing a contacting interface would diminish the desired maximum shielding effect provided by the second part 20 of the tip plate 16 and by the core holder 13.

Alternatively, the core holder 13 may be made of a machinable, nonmagnetic material, which itself does not have shielding properties, for example, of machinable glass ceramic. However, it is then necessary to provide a shield of conductive material (not shown) surrounding the core holder 13 and being in contact with the tip plate 16, to maintain the desired electric shielding properties of the transducer in accordance with the present invention.

As best shown in FIGS. 1 and 3, the multichannel transducer assembly of the preferred embodiment is contoured at the tip plate 16 to expose the transducing gaps at 35 and adjacent pole tips 15 at a length equal to the length of the first portion 19 in the direction 17, to provide a transducer-to-tape contacting interface. Consequently, a transducer-to-medium interface is formed by the exposed pole tips defining transducing gaps and separated from each other by long-wearing, nonmagnetic spacers.

In order to obtain uniform wear in the multichannel transducer-to-medium contact area, while assuring intimate contact between transducer pole tips and medium throughout the life of the transducer, it is preferable to select the material of the first part 19 having a wear resistance in the same range but slightly below that of the magnetic pole tips 15. In the preferred embodiment of the invention, the pole tips 15 are made of alfesil laminations, while the first part 19 is made of a machinable glass ceramic material.

To eliminate undesirable mechanical stresses within the transducer tip plate structure, which may occur due to exposure to extreme ambient temperatures, it is preferable to select the respective materials of the pole tips 15 and of the second part 20 of the tip plate 16 to have coefficients of thermal expansion within the same range. By the latter provision also undesirable effects of track azimuth and gap scatter due to differences in thermal expansion of the various tip plate materials are eliminated. It will be appreciated that development of mechanical stresses due to differences between the respective coefficients of thermal expansion of the first part 19 and of the respective materials utilized in the rest of tip plate 16 is not critical with respect to the relatively small volume of material utilized in portion 19 of the transducer assembly, as it will become more apparent from further disclosure. It will be further appreciated with respect to the preferred embodiment of the invention that even if microscopic cracks develop in the machinable glass material utilized in portion 19, they will not propagate with respect to well known properties of that material. Consequently, structural damages are prevented at temperature ranges encountered in fabrication and operation of the transducer in accordance with the invention.

It will be further appreciated that the present invention provides a multichannel magnetic transducer, which has effective protection against external electric radiation fields and, at the same time, an extremely low wear rate and, thus, substantially extended life. Yet the construction of the multichannel transducer of the invention is relatively simple and economical, as it will follow from the detailed description of the preferred method of the invention.

The preferred method of making a multichannel magnetic transducer in accordance with the invention will be described now with reference to FIGS. 6a to 6g of the accompanying drawings. To facilitate comparison with the previously described embodiments of FIGS. 1 to 5, similar elements in FIGS. 6a to 6g are designated by three digit reference numerals, derived from the two digit numerals of FIGS. 1 to 5 by adding 100 thereto.

FIG. 6a shows a first block portion 119 of a machinable, nonmagnetic material, having an extremely low wear rate, such as a machinable glass ceramic material, for example "Macor", made by Corning Glass Works. A second block portion 120 is formed of a machinable, nonmagnetic, conductive material, such as a nonmagnetic metal, for example, aluminum or brass. Confronting lateral planar surfaces 121, 122 preferably corresponding in size, of the respective blocks 119, 120 are lapped and polished to achieve maximum flatness. Thereafter, confronting surfaces 121, 122 are clamped together and bonded with a suitable adhesive, for example, epoxy-type Ablestick 410-3, while maintaining bonding and curing conditions as directed by the manufacturer. The length of the first part 119 in the direction normal to the bonded surfaces 121, 122 is selected such that after performing the subsequent method steps, as described below, a composite half-tip plate is formed whose length of the first part 19 is equal to one-half of the transducer to recording medium contact length in the direction of the relative transducer-to-medium movement, as it will follow from further disclosure.

The resulting composite block 116a, shown in FIG. 6b, is lapped flat at parallel planar surfaces 123, 124 to remove any "step" which might result from the bonding process. Lateral planar surface 132, opposite to bonded surfaces 121, 122 is ground parallel therewith to provide a reference surface for the subsequent manufacturing steps. Block 116a is provided with a beveled lateral surface 126 machined at an angle α along a longitudinal edge 125. Angle α is referenced to surface 132 of block 116a, and it is selected to provide surface 126 to be flush with a corresponding lateral surface 142 of holder 113 in the transducer assembly, as shown in FIGS. 6d to 6g and will become more apparent from further description. In the preferred embodiment α is selected to be 17 degrees.

Two or more composite blocks 116a are precisely aligned on a fixture (not shown); and a plurality of parallel pole tip grooves 127 and shield slots 128, respectively, is machined into the surface 123 from the side of the reference surface 132. In FIG. 6c an enlarged view of a portion of the multichannel transducer tip plate 116a is shown, including only four channels, for better clarity of representation. As shown in FIG. 6c, the parallel grooves and slots extend perpendicularly to the reference surface 132. It is preferable to machine the above grooves simultaneously into an even number of composite blocks, which are precisely aligned on a common fixture; since these blocks will be assembled in matched pairs to form a resulting transducer tip plate 116, with precisely matched grooves 127 and slots 128 into which corresponding pairs of pole tips 15 and shields 14 are inserted, respectively, as shown in FIG. 1. As it is seen in FIG. 6c, core grooves 127 extend across the entire length of the composite block 116a for ease of manufacturing, while the shield slots 128 are shorter, but extend beyond the length of the inserted pole tips 115. The shield slots 128 extend through both surfaces 123, 124 of the composite block 116a, to facilitate inserting the shields into these slots, as it will follow from the further description. For the slot and groove cutting operation preferably carbide saw blades are utilized, such as manufactured by Robb Jack Corp. The thickness of the blades is selected to correspond to the desired width of the respective grooves 127 and slots 128, as it is known in the art. It is desirable to prevent chipping of the walls during the cutting operation, and also to provide a cross section as close to rectangular as possible, for snug accommodation of the shields 114 and pole tips 115 in the slots and grooves, respectively. To remove from the slotted tip plate 116a any microscopic chips and cracks which may result from the cutting operation, the tip plate is ground flat at the surface 123 to remove a surface layer about 10 mils thick. It is preferable to utilize a different grinding wheel for the respective portions 119, 120 of the slotted composite block 116a, with respect to the differences in the material structure of these portions. For example, for grinding the aluminum portion 120, it is preferable to utilize a coarse grit grinding wheel, such as "Crystalon", made by Norton Corp., to prevent the wheel from clogging with aluminum dust. On the other hand, for grinding the machinable glass ceramic portion 119, a metal bonded fine diamond grit wheel may be utilized to prevent the glass ceramic from cracking and chipping under a coarse wheel. It will be understood, however, that instead of grinding, lapping may be employed to remove a top layer at surface 123 from the slotted block 116a.

A plurality of elongated rectangular magnetic pole tips 115 is formed for mated insertion into the grooves 127, as best shown in FIG. 6c. The material of the pole tips is selected to have a wear resistance within the same range as the material utilized for the first block portion 119 of the composite tip plate 116a, to eliminate differential wear. However, it is preferable to select the material of the first block portion 119 to have a slightly faster wear rate than pole tips 115 to assure intimate contact between the tips 115 and contacting magnetic medium throughout the life of the transducer. In the preferred embodiment of the invention, the pole tips 115 are made of alfesil laminations by a method well known in the art. Preferably, the thickness of the pole tips 115 is such that when inserted into the corresponding grooves 127 they slightly protrude therefrom above the planar surface 123 of tip plate 116a, to assure better contact with the transducer cores 111, as it will follow from further description. The pole tips 115 are secured in grooves 127, for example, by epoxy bonding, as it is well known in the art. Thereafter the surface 123 is cleaned from any epoxy residue. Also, epoxy residue is removed from the shield slots 128, for example, by scraping out with a suitable tool. Surface 123 and slightly protruding surfaces of the alfesil cores 115 therefrom are lapped and polished to assure good pole tip 115 to core 111 surface contact in the final transducer assembly 136, as it will follow from the description below.

Two corresponding half core holders are formed, with cores 111 securely held therein, such as previously described and shown at 13a and 13b, respectively, in FIGS. 1 to 5. With reference to FIG. 6d, the half core holder 113a is aligned with the half tip plate 116a, having the beveled upper surface 141 of the holder confronting the lower surface 123 of the half tip plate.

As shown in FIG. 6d, prior to joining the half-core holder 113a to the composite tip plate 116a, the ferrite cores 111 are slightly shortened by step grinding at lateral surface 143, as it is well known in the art, in a plane parallel to the lateral surface 133. By the latter operation better definition of the transducing gap is provided, as it will become more apparent from the description below. Thereafter, the beveled top surface 141 of core holders 113a, 113b is lapped and polished and a matched pair of composite tip plates 116a, 116b is respectively assembled with a matched pair of core holder assemblies 113a, 113b with respective planar surfaces 123 and 141 abutting and having the respective pole tips 115 and cores 111 in registration, as it is shown in FIGS. 6d to 6f. First, each half tip plate 116a, 116b is securely held together with a corresponding half core holder assembly 113a, 113b, respectively, for example, clamped together to obtain two corresponding and similar transducer half assemblies, as shown at 136a in FIG. 6c. In the thusly obtained transducer half assembly 136a, the shield slots 128 of tip plate 116a, shown in FIG. 1 at 28, are aligned with the corresponding shield slots 145, shown in FIG. 5 at 45, of the half-core assembly 113a, in preparation for inserting shields 14, as it will be disclosed later. Then, each composite half tip plate 116a, 116b is bonded to the corresponding half-core assembly 113a, 113b respectively, at the abutting surfaces 123, 141, for example, with a suitable adhesive, such as epoxy. It is important to apply sufficient pressure to the abutting pole tips 115 and cores 111 to prevent the bonding material from entering therebetween and, thus, to prevent an undesirable increased reluctance of the individual magnetic circuits. However, during bonding operation the epoxy flows freely between the rest of the confronting surfaces 123, 141, while also filling the portions of the grooves 144 not occupied by the poles 115, as shown in FIG. 6e. Consequently, an effective epoxy bond is provided between the half tip plates and corresponding half core holders, respectively, thus forming two matched corresponding half transducer assemblies 136a, 136b, as shown in FIG. 6f. To assure that a transducing gap of precisely defined dimensions will be formed between confronting pole tips 115, rather than between the cores 111, the cores 111 have been made slightly shorter at surface 143 than the abutting pole tips 115, as it has been described above with reference to FIG. 6d. Thus, the confronting cores 111 do not contact each other in the area adjacent to the gap, and a well defined transducing gap depth is provided between corresponding pole tips 115.

With reference to FIG. 6e, the half transducer assembly 136a obtained by the above-described method steps, is lapped parallel at the lateral surface 133 thereof to obtain a transducing gap plane 135. The plane 135 extends over alternate adjacent portions of pole tips 115 and first part 119 of the half pole tip plate 116a, respectively as best shown at 35 in FIGS. 1 and 2. The original lateral surface 133 is shown, prior to lapping operation, in phantom in FIG. 6e. By the lapping operation a surface portion of dimension "d" on tip plate 16a is obtained, which dimension will be further reduced by contouring steps to obtain a desired gap depth, as it will be disclosed later. In the preferred embodiment d=9 mils prior to contouring.

The gap plane 135 is polished to obtain maximum flatness. Nonmagnetic transducing gap forming material is provided on that portion of the surface 135 which extends over the half tip plate of one or both corresponding transducer side assemblies 136a, 136b. The gap forming material may be provided by a number of known materials and processes, such as by a nonmagnetic shim, vacuum evaportion or sputtering process. In the preferred embodiment, SiO is deposited by vacuum deposition process to a desired thickness on the above-indicated surface portions of both half tip plates 116a and 116b. The total thickness of the deposited SiO layer defines the desired transducing gap length. In the preferred embodiment the gap length is selected between 20 and 100 microinches depending on whether the transducer is utilized for reproduction or recording. During the deposition process the portions of surface 135 which do not extend over the tip plate 116 are covered by a suitable mask (not shown), such as made of stainless steel, to prevent the gap material from depositing thereon, as it is known in the vacuum deposition art.

With reference to FIGS. 6f and 6g, a matched pair of transducer half assemblies 136a, 136b is aligned with corresponding gap planes 135 abutting and with corresponding pole tips 115 and sheild slots in precise registration. By the latter method step a plurality of individual magnetic transducer circuits is completed, each including a pair of cores 111 and of poles 115, respectively, and transversing a transducing gap at 135, having precisely defined dimensions. By precisely controlling the registration of corresponding pairs of pole tips 115, track misalignment is eliminated. The thusly aligned half assemblies 136a and 136b are held firmly in registration, for example, by clamping together. A plurality of electromagnetic shields 14 is inserted, as best shown in FIGS. 1 and 2, into slots 28 extending inwardly from the tip plate 16 and being in registration with slots 45 of the core holder 13, as it has been previously described. The shields are supported by a shield stop rod 46 made of a nonmagnetic material, such as stainless steel, as it has been described previously with reference to FIG. 2. Preferably, the shields are made of mumetal sandwiched between two berylium-copper laminations. The entire assembly is then potted with a suitable binder, for example, epoxy resin, in a manner well known in the art.

The thusly formed multichannel transducer assembly 136 is contoured to a desired contour by employing well known techniques. In the preferred embodiment of the multichannel transducer assembly 136 of FIG. 6g, a symmetrical contour 138 is provided with respect to gap plane 135. The contour 138 has a desired radius at the gap plane and a contiguous symmetrically tapered region extending away from the gap plane, at an angle $\beta$ with respect to a plane 137 which is perpendicular to the gap plane 135. In the preferred embodiment $\beta = 13$ degrees. A portion of the transducer tip plate 116, which has been removed by contouring, is shown in phantom in FIG. 6g. By the particular contouring process employed in the preferred embodiment, the entire portion of the first part 119 extending over the pole tips 115 is removed to expose the pole tips 115 at a length corresponding to the transducer-to-recording medium contact length in the direction of the relative transducer-to-medium movement 117. The exposed total length of the pole tip corresponds to the length of the first part 119 of the tip plate 116 which, in the transducer assembly of the preferred embodiment is about 120 mils. Thus, by the above described contouring step a transducer-to-medium contact area is obtained which is formed of a plurality of transducer pole tips 115 defining gaps 135 and separated from each other by the alternative portions of the first part 119 of tip plate 116. By contouring, a desired final dimension of the gap depth is obtained, which in the preferred embodiment is 2–3 mils. It will be appreciated that with respect to the long wearing properties of the transducer of the invention, the obtained gap depth may be reduced approximately three to four times with respect to known prior art transducers having tip plates of relatively soft, nonmagnetic materials, such as aluminum or brass, in the transducer-to-medium contact area, while the transducer life remains the same. By reducing the gap depth, transducer efficiency is increased proportionally.

Alternatively, when utilizing the invention, transducer life may be extended three to four times with respect to conventional transducers having tip plates of soft, nonmagnetic materials, and having the same gap depth. When extending the length of the first part 119 beyond the interface contact area, an undesired reduction of the electric shielding properties of the transducer assembly results. On the other hand, when the first part 119 has a shorter length than the interface contact area, undesirable differential wear between the first part 119 and second part 120 of the transducer tip plate results. Consequently, as it has been described with reference to the preferred embodiments, it is desirable to provide a final contour of the multichannel transducer 136 such that the length of the exposed portions of the pole tips 115 corresponds to the length of the first part 119 of the composite tip plate 116 to eliminate the above mentioned undesirable effects. In FIG. 1 the pole tips 15 are shown as having an exposed length, as above indicated, while the unexposed portions, extending under the contoured surface 38, are shown in phantom.

It follows from the above-described method that in the resulting multichannel transducer assembly the volume of the wear-resistant material of the first part of the tip plate is small when comparing to the volume of the rest of the tip plate. The volume of the first part 119 in the preferred embodiment dependent on by its length in the direction 117 and the cross section of the contoured tip plate 116, forming a 4 degree wedge determined by the difference angle $(\alpha - \beta)$, as shown in FIG. 6g. Consequently, mechanical stresses resulting from differences between coefficients of thermal expansion of the respective materials utilized in the first part and the rest of the tip plate are negligible.

It will be understood by those skilled in the art, that preferably, the transducer is contoured to provide an initial transducer-to-medium contact length shorter than the length of the exposed pole tips 115 or of the first part 119, in the direction 117 of the transducer-to-medium relative movement. In the preferred embodiment a contact length of about 30 to 40 mils is provided. As it is known in the art, the initial contour of a transducer which is in contact with the recording medium, gradually wears down, while the length of the transducer-to-medium interface portion gradually extends with wear. With respect to the foregoing, it is noted that throughout the disclosure where there is stated that the length of the first part of the tip plate or the length of the exposed pole tips is equal to the transducer-to-medium interface or contact length, it is referred to the maximum interface or contact length occurring during the life of that particular transducer described.

It will be appreciated that the above-described transducer of the invention has a significantly extended life; and, at the same time, it has excellent electric shielding properties for elimination of external noise. Besides, the transducer tip plate is readily machinable, thus, providing for economical manufacture.

While preferred embodiments of the invention have been described above and are illustrated in the drawings, it will be appreciated that a number of alternatives and modifications may be made which will fall within the scope of the appended claims.

I claim:

1. In a multichannel magnetic transducer assembly having a pole tip plate of a nonmagnetic material, formed of two corresponding half-tip plates abutting at a transducing gap plane, said half-tip plates each including a plurality of machined spaced parallel slots receiving a plurality of magnetic pole tips securely mounted therein, corresponding pole tips of each half-tip plate being mounted in registration with each-other having nonmagnetic transducing gap material disposed between them, a core holder made of a nonmagnetic electrically conductive material, supporting a plurality of spaced magnetic core members with coil means, said core holder having a surface receiving the pole tip plate in mated secured engagement and with the pole tips engaging the core members to form an integral multichannel transducer assembly having a plurality of magnetic transducer circuits, the improvement comprising:

(a) each half-tip plate having a first part (19) made of a nonmagnetic, wear-resistant, machineable material, extending in the transducer-to-medium interface area and a contiguous second part (20) made of a nonmagnetic, conductive, machineable material, said first part having a first (21) and a second (35) opposite planar surface, said second part (20) having a third planar surface (22) confronting with said first planar surface (21) of said first part (20);

(b) a bond integrally joining said first (19) and second (20) parts at said respective confronting first (21) and third (22) planar surfaces;

(c) said plurality of parallel slots (127) extending transversely with respect to said integrally joined planar surfaces (21; 22); and (d) said corresponding half-tip plates (16a; 16b) being assembled with their respective first parts (19) abutting at said respective second planar surfaces (35) forming said transducing gap plane.

2. The improved transducer assembly of claim 1, wherein said abutting first parts of the tip plate have a combined length corresponding to the length of the transducer-to-medium interface in the direction of a relative transducer-to-magnetic medium movement.

3. The improved transducer assembly of claim 2, wherein said transducer-to-magnetic medium interface comprises an exposed portion of the pole tips defining said transducing gaps, said exposed portion having a length corresponding to said combined length of the abutting first parts.

4. The improved transducer assembly of claim 1, wherein said first parts of said half-tip plates are made of a material having a wear resistance in the same range but below that of the material of said magnetic pole tips.

5. The improved transducer assembly of claim 1, wherein said core holder is integrally joined with the corresponding half-tip plates at corresponding planar surfaces symmetrically beveled with respect to the gap plane, and extending away therefrom at a predetermined angle.

6. The improved transducer assembly of claim 1, wherein a plurality of shield slots is provided in both said core holder and integrally joined tip plate, said respective shield slots being in registration with each other, and a plurality of electromagnetic shields is rigidly secured in said shield slots, and extend in both said core holder and tip plate to provide interchannel shielding between adjacent transducer circuits.

7. The improved transducer assembly of claim 6, further comprising a shield stop rod of nonmagnetic material arranged in said core holder to support said shields in a predetermined position within said slots.

8. The improved transducer assembly of claim 1, wherein said first parts of said half-tip plates are made of a machinable glass ceramic material.

9. The improved transducer assembly of claim 1, wherein the magnetic pole tips are made of alfesil.

10. The improved transducer assembly of claim 1, wherein said second parts of said half pole tip plates and said core holder are both made of the same nonmagnetic, machinable, electrically conductive material.

11. The improved transducer assembly of claim 10, wherein said second parts of said half pole tip plates and said core holder are both made of aluminum or brass.

12. The improved transducer assembly of claim 1, wherein said bond integrally joining said first and second part is an epoxy bond.

13. The improved transducer assembly of claim 1, wherein said pole tips are mounted in said slots by epoxy bonding means.

14. The improved transducer assembly of claim 1, wherein said corresponding half-tip plates are integrally joined to said core holder, respectively, by epoxy bonding means.

15. The improved transducer assembly of claim 1, wherein the respective materials of said pole tips and said second parts of the half-tip plates are selected to have a coefficient of thermal expansion within the same range.

* * * * *